P. COLIDGE.
ADJUSTABLE SUPPORT.
APPLICATION FILED AUG. 21, 1914.
1,150,502.
Patented Aug. 17, 1915.
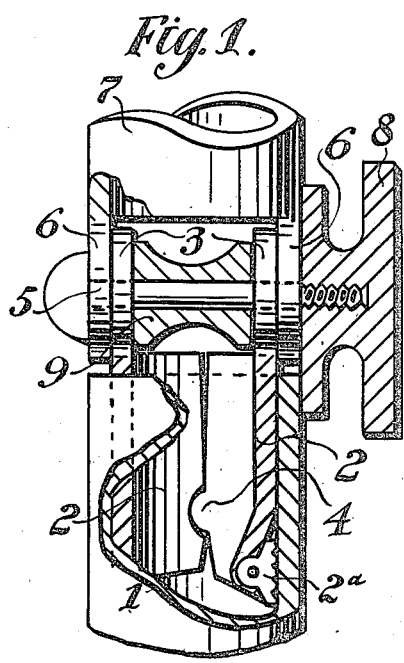
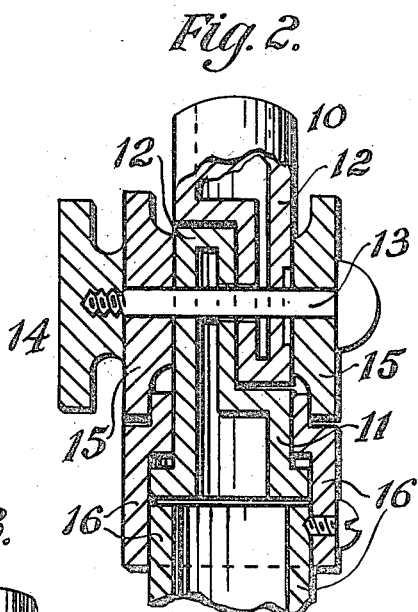
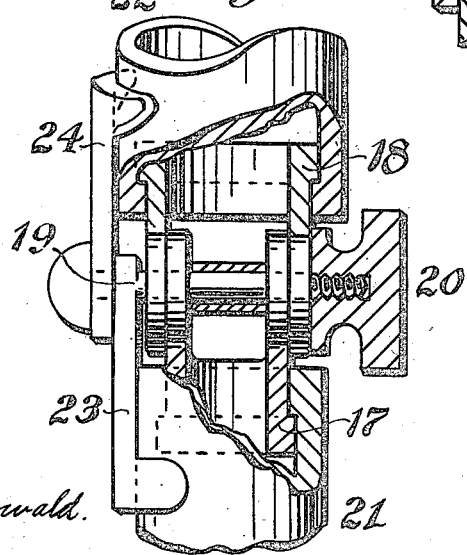
Witnesses
John Bowald.
August Andersen.
Inventor
Paul Colidge.

UNITED STATES PATENT OFFICE.

PAUL COLIDGE, OF NEW YORK, N. Y.

ADJUSTABLE SUPPORT.

1,150,502.     Specification of Letters Patent.     Patented Aug. 17, 1915.

Application filed August 21, 1914. Serial No. 857,889.

*To all whom it may concern:*

Be it known that I, PAUL COLIDGE, citizen of the United States, and resident of New York city, in the county of New York and State of New York, have invented a certain new and useful Adjustable Support, of which the following is a specification.

This invention relates to an adjustable support which has been specially designed for electric and gas lamps, but which can also be used for other purposes.

The especial aim of this invention is to provide an universal joint of very simple construction for supports that comprise two or more sections.

In the accompanying drawing, Figure 1 is a sectional view illustrating the invention as when constructed for electric light fixtures, brackets, or the like; Fig. 2 is a view of a modification of the invention; Fig. 3 is a view of another modification.

Referring to the embodiment of the invention illustrated in Fig. 1, the tubular section 1 serves to receive therein a member 2. The upper end of the member 2 is formed in pivot lugs 3 having pivotal connection with similar lugs 6 extending from the adjacent end of another tubular section 7. A bolt or similar fastening constitutes the pivot 5 by which the parts 1 and 7 are connected together. The section 2 is rotatable in the sleeve 1.

To fasten the joint and regulate the friction of the several adjustments thereof, I provide a single clamping screw and nut 8 both of which can be of any suitable shape. The nut 8 partly overlaps and is adapted to clamp the sleeve 1.

In some cases in addition to the swinging of the pivoted parts and the rotating in the sleeve 1, a slipping or telescoping adjustment of the rod or pipe section may be desired, and when this is the case I preferably make the member 2 parted in two as shown in Fig. 1. Each of the halves is slightly tapering to its ends, leaving some space between.

The part 4 serves as a pivot. By adjusting the screw-nut 8 I secure an adjustable pressure upon the lugs 6 and 3, forcing the lower end of the part 2 outward and in an engagement with the sleeve 1. The lower ends of the parts 2 can be of any suitable form for the best engagement of the sleeve 1. For an example one end 2ª of the part 2 is shown toothed and pivoted. The sleeve 1 and the sliding parts 2 may be of any suitable length and material.

The modification of the invention shown in Fig. 2 is intended to represent pipe sections through which a flow of liquid, gas or the like, may pass. The hollow lug 11 is pivoted to the similar lug 12 by the bolt 13 with the nut 14.

Any usual passage between the hollow lugs may be employed. The two washers 15 are placed to strengthen the joint and for the engaging of the sleeve 16 at the adjustment of the joint.

Referring to Fig. 3 the parts illustrated are in substantially the same mechanical relation as described in Figs. 1 and 2. The upper end of the sleeve 17 is formed with pivot lugs having pivotal connection with similar lugs extending from the adjacent end of the sleeve 18. A bolt or similar fastening constitutes the pivot 19 with screw nut 20 by which the parts 17 and 18 are connected together. The sleeve 17 is rotatable in the section 21 and the sleeve 18 is rotatable in the section 22. Two additional pieces 23 and 24 are attached to the bolt 19 in such a manner that at the adjustment of the device the pieces 23 and 24 are pressing on adjacent sides of the sections 21 and 22, keeping the sections in any adjusted position. The piece 24 is pivoted to the bolt 19 and the piece 23 is fastened to the bolt 19 rigidly. By this last arrangement the piece 23 serves also as a prop at the screwing on the nut 20 preventing the swerving of the bolt 19. The bolt 19 can be kept from swerving at the tightening of its nut 20 in any manner as it is immaterial.

I believe that the simplicity and convenience of my device are evident.

Having thus described the invention, what is claimed as new, is:

1. In an adjustable support, the combination of a pivot-pin, two or more sections provided with lugs and connected by the pivot-pin, rotatable members attached to the sections and means provided on the pivot pin for compressing the lugs and adjacent parts of the rotatable members close to each other simultaneously.

2. In an adjustable support, the combination of a supporting section, a member rotatably and slidingly connected thereto divided lengthwise in two parts, said two parts pivoted in middle, a fastening screw pressing the upper ends of the two rotatable and sliding parts toward each other and forcing apart the lower ends into an engagement with the supporting section by this arrangement adjusting the device.

3. In an adjustable support, the combination of a supporting section, rod or pipe member sliding and rotatable in the supporting section, the rod or pipe member consisting of two parts engaging each other, another section pivoted to the sliding member, a clamping screw pressing on the pivoted sectional sliding members forcing lower parts of the sliding members apart and into an engagement with the supporting section thusly locking the sliding member in the supporting section and the pivoted section to the sliding member by pressure of the screw.

4. In an adjustable support, the combination of a pivot pin, and pivoted sections, an additional member rotating on one of the sections, the head or nut of the pivot pin having an extension adapted to engage the rotating member and clamp the same from movement.

5. In an adjustable support, the combination of a pivot pin connecting two sections with two members rotatably placed on the sections and means provided on the pivot's pin for instantaneous locking of the pivoted and rotating parts at different relative positions to each other.

6. In an adjustable support the combination of a pivot pin, pivoted sections mounted thereon, a rotating member on one of the sections, the ends of the pivot pin having extensions adapted to contact with and simultaneously clamp the pivoted sections and rotating member from movement.

7. In an adjustable support, the combination of a pivot pin, sections connected by the pin, rotatable members mounted on one or both of the sections and means provided on the pivot pin for engaging and locking of all the mentioned parts at once by one motion.

8. In an adjustable support, the combination of two members pivoted together and sliding and rotating in an additional section, means provided for acting on adjacent ends of the pivoted members and by this arrangement forcing the opposite ends of the pivoted members into an engagement with the additional section thusly adjusting all the mentioned parts of the device in different relative positions to each other.

PAUL COLIDGE.

Witnesses:
 JOHN BOWALD,
 AUGUST ANDERSEN.